Jan. 17, 1961    G. L. HILL    2,968,412
TRAILER-TRACTOR
Filed Sept. 24, 1957    2 Sheets-Sheet 1
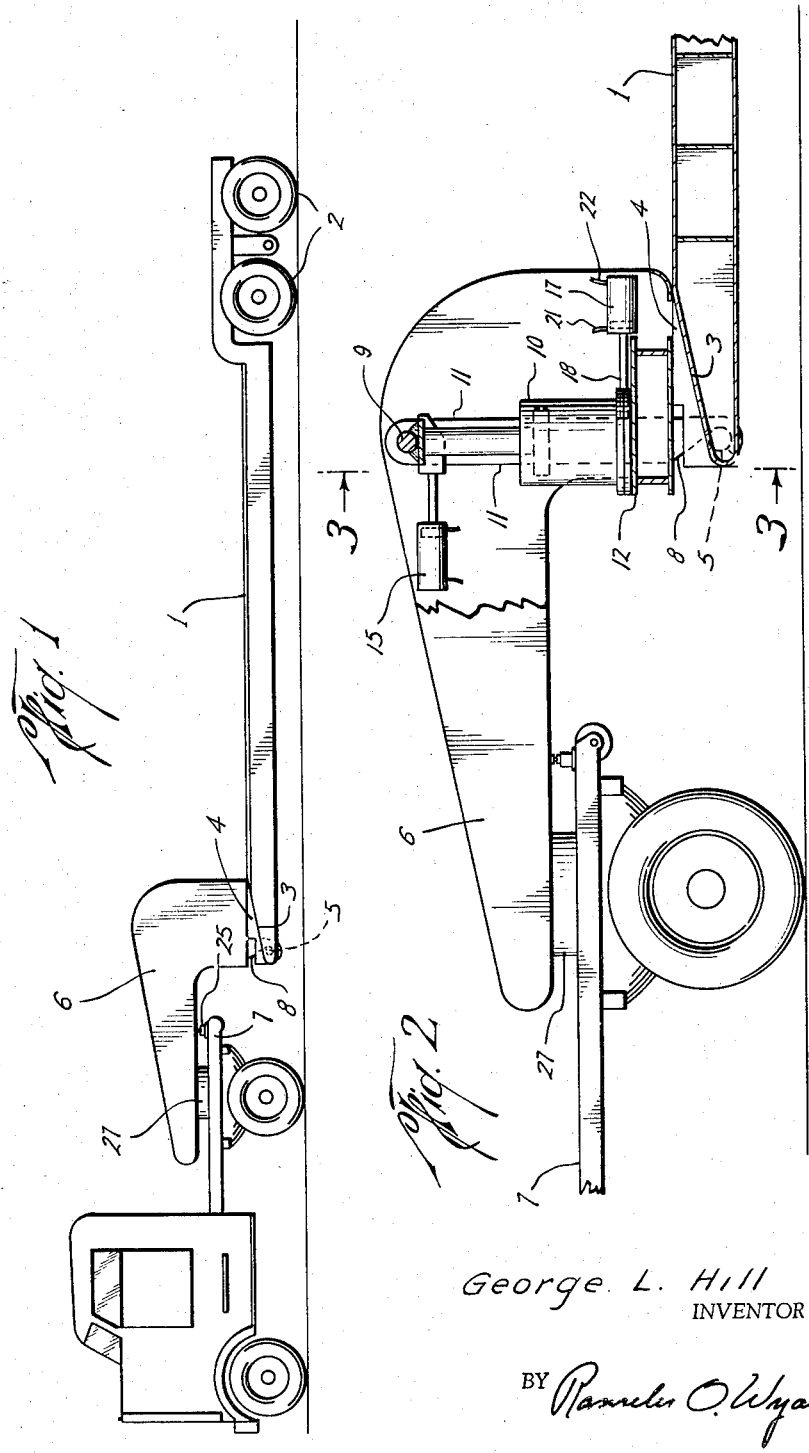
George L. Hill
INVENTOR
BY
ATTORNEY Jan. 17, 1961 G. L. HILL 2,968,412
TRAILER-TRACTOR
Filed Sept. 24, 1957 2 Sheets-Sheet 2
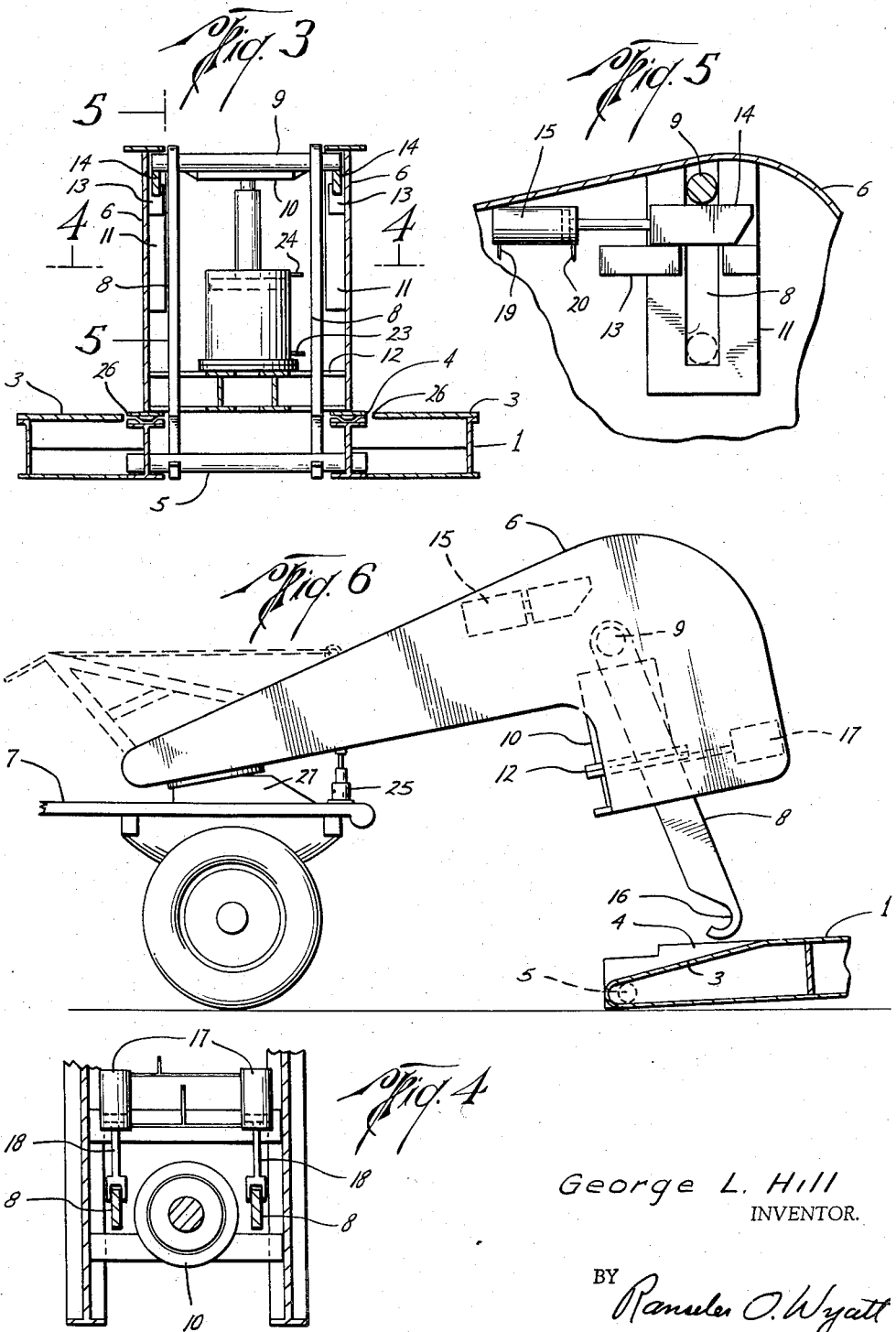
George L. Hill
INVENTOR.

United States Patent Office 2,968,412
Patented Jan. 17, 1961

2,968,412
TRAILER-TRACTOR
George L. Hill, Houston, Tex.
Filed Sept. 24, 1957, Ser. No. 685,993
4 Claims. (Cl. 214—505)

This invention relates to new and useful improvements in a tractor-trailer.

It is an object of this invention to provide a tractor-trailer having novel means for connecting the tractor to the trailer and lifting the trailer into running position.

It is another object of the invention to provide a trailer hitch having pneumatic operated connecting means and lifting means.

It is another object of this invention to provide a means for connecting trailers to tractors having novel means for raising and lowering the connecting means.

The present type of trailer referred to in the trade as a "low-boy" is employed to haul heavy duty equipment, and is difficult to load and after loaded requires considerable heavy equipment to raise the free end of the trailer and connect same to a tractor. It is an object of this invention to provide a trailer for loading and carrying heavy duty equipment that may be easily and quickly loaded, and a tractor that may be quickly and easily connected to said trailer by means of self-contained mechanism.

With the above and other objects in view, the invention has relation to certain novel features of construction, operation and arrangement of parts more specifically defined in the following specifications and illustrated in the accompanying drawings, wherein:

Figure 1 is a side elevational view of the tractor-trailer in connected position.

Figure 2 is a side elevational view of the tractor-trailer in connected position, partially in cross section.

Figure 3 is a front elevational view, in cross section, of the connecting means, taken on the line 3—3 of Figure 2.

Figure 4 is a top view, in cross section, of the connecting means, taken on the line 4—4 of Figure 3.

Figure 5 is a side elevational view, in cross section, of the connecting means taken on the line 5—5 of Figure 3, and Figure 6 is a side elevational view of the tractor-trailer in disconnected position.

Referring now more particularly to the drawings, the numeral 1 designates a trailer, commonly referred to as a low-boy, having the usual rear wheels 2, 2. The forward end of the trailer 1 has the downwardly sloped tracks 3 at its outer margins and between the framework of the trailer 1 forming the tracks 3, is a continuation of the trailer bed forming a connector rest 4. A connector bar 5 extends transversely through the forward end of the trailer 1.

A yoke having the side members 6, 6, is pivotally mounted to the tractor 7 on the usual fifth wheel of the tractor as 27. The members 6, 6, are preferably plate steel having marginal flanges, and have their outwardly extended ends downwardly turned forming a neck. Between the said ends are mounted the connector arms 8, 8, which are pivotally mounted to the supporting bar 9, which is welded, or otherwise secured, to the lift 10. The outer ends of the bar 9 extend between guide plates as 11, 11 and the bar 9 is movable vertically between said plates. The lift 10, which is preferably hydraulically operated, is mounted on the platform 12 at the downwardly turned terminus of the members 6, 6. Tracks are formed on each member 6, 6 as at 13, 13, in which the locking members 14, 14 reciprocate. A suitable means, such as the hydraulic rams 15, 15 move said locking means 14, 14 in said tracks.

The lower end of the connector arms 8 have grooves forming hooks as at 16, to receive the bar 5. Mounted on each member 6, 6 is a hydraulic ram 17, 17 which has the shafts 18, 18 connected to the respective arms 8, 8. Each of the rams 15, 17, 17 are two way rams, so that pressure may be applied to either end as through the lines 19, 20, 21, 22, to move the shafts inwardly or outwardly. The lift 10 is also provided with the lines 23, 24 to move the lift upwardly or downwardly.

The yoke formed by the members 6, 6 may be raised or lowered by means of the usual winch, as shown in dotted lines in Figure 6, or by means of the hydraulic jack 25.

The trailer 1, when in disconnected position, will have the forward end resting on the ground level, and vehicles to be loaded on the trailer may be readily driven on the tracks 3, 3, and onto the trailer bed. When it is desired to move the trailer, the tractor is moved into position with the yoke raised and the lift 10 lowered, and the arms 8, 8 extended downwardly and in retracted position, the arms 17, 17 having been actuated to retract the arms, and maintain them in that position, as shown in Figure 6. When the arms 8, 8 are over the forward end of the trailer, the yoke is lowered and the rams actuated to move the arms 8, 8 into connected position with the bar 5, which will be seated in the hooks 16, 16. The bottom of the members 6, 6 seat in suitable tracks as 26, 26 in the connector rest 4, which act as guides to correctly position the yoke on the trailer. The lift is then actuated to raise the connector arms 8, 8 until the bar 9 reaches the top of the tracks 11, 11, and the ram 15 is then actuated to move the locking means 14 into position beneath the bar 9 to prevent movement of the arms 8, 8. To disconnect the trailer, the locking means 14 is withdrawn from beneath the bar 9 and the lift 10 lowered, moving the bar 9 and arms 8, 8 downwardly until the trailer rests on the ground level. The rams 17 are then actuated to move the arms 8, 8 out of connection with the bar 5, and the yoke raised by the jack 25.

It is contemplated that the tractor will be equipped with the usual air compressor (not shown) to provide the necessary power to operate the rams, or that other suitable hydraulic means may be provided to furnish this power.

While the foregoing is considered a preferred form of the invention, it is by way of illustration only, the broad principle of the invention being defined by the appended claims.

What I claim is:

1. In a tractor-trailer, a trailer having wheels at one end and downwardly sloped vehicle tracks at the other end, a yoke rest between said vehicle tracks and a trailer bar extending between said vehicle tracks, a hydraulic jack mounted in said yoke having a lifting arm extending vertically therefrom, a pair of connecting arm guides in said yoke, a connecting arm bar having its respective ends mounted in said guides, connecting arms pivotally mounted on said bar, said lifting bar being movable into contact with said connecting arm bar, and said connecting arms having means for receiving said trailer bar on the extended ends thereof.

2. In a tractor-trailer, a trailer having wheels at one end and downwardly sloped vehicle tracks at the other end, a yoke rest between said vehicle tracks and a trailer bar extending between said vehicle tracks, a hydraulic jack mounted in said yoke having a lifting arm extending vertically therefrom, a pair of connecting arm guides in said yoke, a connecting arm bar having its respective ends mounted in said guides, connecting arms pivotally mounted on said bar, said lifting bar being movable into contact with said connecting arm bar, said connecting arms having means for receiving said trailer bar on the extended ends thereof and hydraulic means for selectively moving the extended ends of said connecting arms horizontally.

3. In a tractor-trailer, a trailer having wheels at one end and downwardly sloped vehicle tracks at the other end, a yoke rest between said vehicle tracks and a trailer bar extending between said vehicle tracks, a hydraulic jack mounted in said yoke having a lifting arm extending vertically therefrom, a pair of connecting arm guides in said yoke, a connecting arm bar having its respective ends mounted in said guides, connecting arms pivotally mounted on said bar, said lifting bar being movable into contact with said connecting arm bar, and said connecting arms having means for receiving said trailer bar on the extended ends thereof and a pair of locking bar tracks adjacent the upper ends of said guides and horizontally movable locking bars on said locking bar tracks adapted to be moved into and out of locking relation with said connecting arm bar and hydraulic rams in connection with said locking bars for selectively moving said bars into and out of locking position.

4. In a tractor-trailer, a trailer having wheels at one end and downwardly sloped vehicle tracks at the other end, a yoke rest between said vehicle tracks and a trailer bar extending between said vehicle tracks, a hydraulic jack mounted in said yoke having a lifting arm extending vertically therefrom, a pair of connecting arm guides in said yoke, a connecting arm bar having its respective ends mounted in said guides, connecting arms pivotally mounted on said bar, said lifting bar being movable into contact with said connecting arm bar, said connecting arms having means for receiving said trailer bar on the extended ends thereof and means on said tractor for hydraulically lifting or lowering said yoke.

References Cited in the file of this patent
UNITED STATES PATENTS

| | | |
|---|---|---|
| 2,545,584 | Meadows | Mar. 20, 1951 |
| 2,717,707 | Martin | Sept. 13, 1955 |